United States Patent
Jones et al.

(10) Patent No.: US 10,081,419 B2
(45) Date of Patent: Sep. 25, 2018

(54) MONITORING COMPONENT ASYMMETRY

(71) Applicant: Goodrich Actuation Systems Limited, Solihull, West Midlands (GB)

(72) Inventors: Tony Jones, Birmingham (GB); Peter William Bacon, Wolverhampton (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 0 days.

(21) Appl. No.: 15/240,312

(22) Filed: Aug. 18, 2016

(65) Prior Publication Data

US 2017/0050722 A1    Feb. 23, 2017

(30) Foreign Application Priority Data

Aug. 18, 2015  (EP) .................................... 15181433

(51) Int. Cl.
*B64C 13/16* (2006.01)
*B64C 9/14* (2006.01)
*B64D 45/00* (2006.01)

(52) U.S. Cl.
CPC ............... *B64C 13/16* (2013.01); *B64C 9/14* (2013.01); *B64D 45/00* (2013.01); *B64D 45/0005* (2013.01); *B64D 2045/001* (2013.01)

(58) Field of Classification Search
CPC ........... B64C 13/16; B64C 9/14; B64D 45/00; B64D 45/0005
USPC .......................................................... 701/3
See application file for complete search history.

(56) References Cited

U.S. PATENT DOCUMENTS

| | | | |
|---|---|---|---|
| 5,743,490 A | * | 4/1998 | Gillingham ............. B64C 13/38 244/213 |
| 2002/0030138 A1 | * | 3/2002 | Serven .................... B64C 13/28 244/99.2 |
| 2010/0038493 A1 | * | 2/2010 | Lang .................. B64D 45/0005 244/224 |
| 2010/0100355 A1 | | 4/2010 | Marx et al. |
| 2014/0336865 A1 | | 11/2014 | Catt et al. |
| 2016/0223038 A1 | * | 8/2016 | Murphy ................ F16D 65/028 |

FOREIGN PATENT DOCUMENTS

| | | |
|---|---|---|
| DE | 102010047512 A1 | 4/2012 |
| EP | 0922633 A2 | 6/1999 |
| WO | 2014088625 A1 | 6/2014 |

OTHER PUBLICATIONS

European Search Report for Application No. 15181433.2-1754 dated Dec. 17, 2015. 5 pages.

* cited by examiner

*Primary Examiner* — Yazan A Soofi
(74) *Attorney, Agent, or Firm* — Cantor Colburn LLP

(57) ABSTRACT

A system for monitoring asymmetry between two components includes a comparator having a first input to receive a signal indicative of a position of a first component and a second input to receive a signal indicative of a position of a second component. The system also includes means for performing an integration of a plurality of output signals from the comparator indicative of the difference exceeding the threshold and means for outputting a command signal to actuate a brake in response to the integrating means determining that the number of times the difference exceeds the threshold is in excess of a given value.

8 Claims, 1 Drawing Sheet

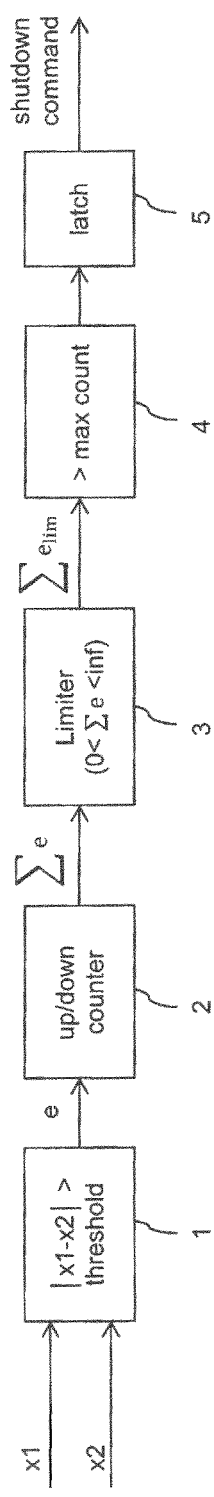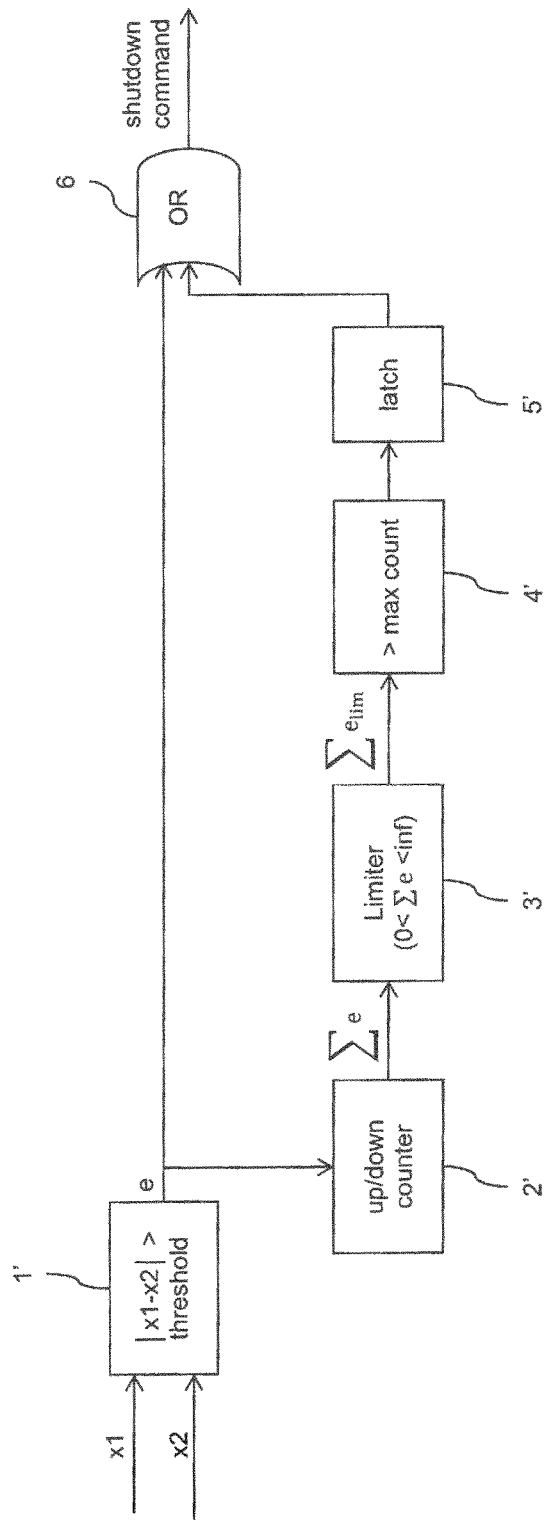

MONITORING COMPONENT ASYMMETRY

FOREIGN PRIORITY

This application claims priority to European Patent Application No. 15181433.2 filed Aug. 18, 2015, the entire contents of which is incorporated herein by reference.

TECHNICAL FIELD

The present invention is concerned with monitoring asymmetry between components such as flaps or slats on aircraft wings.

BACKGROUND

Aircraft wings generally include so-called high lift devices extending from the leading and/or trailing edges of the wing to increase aerodynamic lift during takeoff and landing of the aircraft. When extended from the wing, the high lift devices increase the effective size, curvature, camber and area of the wing, thereby increasing the lift of the wings for slow speed flight. High lift devices extending from the leading edge of the wing are commonly known as slats. Those extending from the trailing edge of the wing are commonly known as flaps.

The aircraft control causes movement of the flaps and slats by driving actuators, which may be hydraulic or pneumatic or electrical actuators.

Various situations can lead to asymmetry between the flaps or slats on the wings. The flaps or slats on one wing can, for some reason, extend or retract more than the flaps or slats on the other wing or flaps or slats on one wing can become jammed in position. Flaps or slats or other panels or components on the same wing/other parts of an aircraft can also exhibit undesirable asymmetry.

Excessive flap or slat asymmetry between wings can be catastrophic. Asymmetry between flaps can cause an uncommanded and pronounced roll towards the wing with the lesser amount of flap extended. Excessive asymmetry between slats can cause uncommanded yaw. This can result in a spin or other loss of control of the aircraft. Furthermore, such asymmetry can cause one wing to produce more lift than the other wing resulting in a stall situation.

Many aircraft manufacturers have installed provisions for detecting and minimising an asymmetric flap or slat condition. In a simple approach, the cockpit displays include needles indicating the positions of the slats/flaps. So long as the needles overlap, the flaps or slats are considered to be symmetrical. Should the two needles separate, the pilot becomes aware that an asymmetric flap or slat situation is occurring and the pilot must intervene to stop movement of the flap or slat.

More sophisticated systems incorporate position sensors and a brake system. If the position sensors detect an asymmetric situation, brakes are automatically activated to stop further movement of the flaps or slats, thus preventing the situation from becoming worse.

Asymmetry can develop very rapidly in the event of mechanical transmission failures and, therefore, high speed monitoring is required to safely arrest or brake disconnected sections of the high lift system to prevent asymmetry.

Asymmetry in other components can also cause problems. The invention is described below in relation to asymmetry between flaps or slats on different wings, but is not so limited. The invention can also be used to respond to asymmetry between flaps or slats or any other components on the same or different wings or, indeed, on different system or aircraft parts. The invention can be used wherever it is necessary to respond to asymmetry between two components.

Typical asymmetry monitors compare wingtip position sensors at high rate (~every 2-3 milliseconds) and calculate the measured asymmetry between wings. This measurement is compared to an asymmetry threshold, and if the threshold is exceeded a fault flag is set "true". The fault flag is passed to a fault integrator which establishes whether the fault is transient (in which case it may simply be due to sensor noise) or persistent (as would be the case for a true asymmetry). If the fault integrator confirms the fault as a true asymmetry it then sends command signals to brakes within the system to arrest the transmission, hopefully before the level of asymmetry has grown beyond the safe limit.

There is, therefore, a delay (typically 20-30 milliseconds) between identifying the asymmetry and operating the brakes, whilst the integration step is carried out.

This delay was intentional, to prevent spurious application of the brakes, in the event of a signal indicating asymmetry which could, for example, have been caused by signal noise, rather than a "true" asymmetrical situation. In the conventional systems, the indication of an error has been confirmed to be persistent for a given number of samples before any action is taken in respect of the brakes.

The aim of the present invention is to provide an improved asymmetry monitoring system and method that provides a more rapid response, but still provides a check against response to spurious signals.

SUMMARY

According to a first aspect, the present invention provides a system for monitoring asymmetry between two components, comprising a comparator having a first input to receive a signal indicative of a position of a first component and a second input to receive a signal indicative of a position of a second component, the comparator configured to compare the difference between the first input and the second input to a predetermined threshold and to output a first signal state in the event that the difference exceeds the threshold; means for performing an integration of a plurality of output first signal states from the comparator indicative of the difference exceeding the threshold; means for outputting a command signal to actuate a brake in response to the integrating means determining that the number of times the difference exceeds the threshold is in excess of a given value; wherein the system further outputs a command signal to actuate the brake, in response to the comparison, each time the difference exceeds the threshold.

Thus, whenever the difference exceeds the threshold, the comparator outputs a first (true) output signal state. This causes a command to be sent to actuate the brake and, in parallel, the comparator output is integrated to validate the "true" condition.

In the preferred embodiment, an OR gate is providing having a first input to receive the output of the comparator and a second input receiving the output of the integrator such that a "true" state at either output provides a command output to actuate the brake. Preferably, if the output state of the comparator is true, a command is sent to actuate the brake and the brake remains actuated if the output from the integrator is also a "true" state.

According to a second aspect, the present invention provides a method for monitoring asymmetry between two components comprising: comparing the difference between a first signal, indicative of a position of a first component, and a second signal, indicative of a position of a second component, with a predetermined threshold and outputting a signal in the event that the difference exceeds the threshold; performing an integration of a plurality of output signals from the comparator indicative of the difference exceeding the threshold; and outputting a command signal to actuate a brake in response to the integrating means determining that the number of times the difference exceeds the threshold is in excess of a given value; a command signal to actuate the brake, in response to the comparison, each time the difference exceeds the threshold.

BRIEF DESCRIPTION OF THE DRAWINGS

Preferred embodiments of the invention will now be described, by way of example only, with reference to the drawings.

FIG. 1 is a block diagram of a conventional asymmetry monitor system.

FIG. 2 is a block diagram of an asymmetry monitor system according to the present invention.

DETAILED DESCRIPTION

Referring first to FIG. 1, a conventional asymmetry monitor and monitoring process will be described.

In the example shown, the inputs to the monitor system correspond to the positions of the flaps or slats on two wings, input x1 being the position of a flap or slat on one wing and x2 being the position of a flap or slat on the other wing. To identify an asymmetry between the two flaps or slats, the difference between the two positions is compared to a threshold by a comparator (1). If the difference exceeds the predetermined threshold, this is indicative of asymmetry. Each time a difference exceeding the threshold is detected, a counter (2) is increased and a fault integrator (3, 4) establishes whether the fault is transient or whether the fault is persistent—i.e. occurs over a given number of counts.

If the fault integrator confirms the fault as a true asymmetry—i.e. if the maximum count value for a true fault is exceeded, the fault flag is latched (5) in the "true" position which causes a shutdown command to be sent to the brakes. Thus, as described in the introduction, the brake is actuated when a detected asymmetry has been confirmed as a true asymmetry fault.

As mentioned above, this means that there will always be a delay (typically 20 to 30 milliseconds) between detection of an asymmetry fault and the brake actually being commanded.

Referring now to FIG. 2, this shows the system and method according to the present invention.

The inputs to the system and the threshold comparator are the same as described above for the conventional system.

In the present invention, however, as soon as the threshold comparison (1') indicates asymmetry, a signal is sent to provide a shutdown command to the brake, e.g. via OR gate (6).

At the same time, i.e. in parallel, the asymmetry detection signal is provided to the up/down counter (2') and the fault integrator (3', 4') in the same way as described above for the conventional monitor layout.

The output of the fault integrator and the "true" flag latch is also provided to the OR gate (6) to provide a shutdown command to the brake.

The fault integration, as with conventional systems, generally includes an up/down counter (2') and limiter (3'), a "max count" comparator (4') and a latch (5'). The counter (2, 2') implements a counting strategy to quantify the amount of successive samples which are indicating an error condition. This typically consists of a running total which is incremented by a defined up count value each time a sample is true, and decremented by a defined down count value if the sample is false. The running total is usually restricted by a Limiter (3, 3') such that it will not be allowed to count down below zero. The up count rate is also typically configured to be higher than the down count rate in order to bias the monitor towards indication in the event of cyclic faults.

The "max count" comparator (4, 4') compares the running total from the Counter/Limiter to a predefined monitoring threshold, and if the total exceeds the threshold, the latch (5, 5') sets a logical fault flag to true. This flag is not reset if the count subsequently falls below the threshold. The fault flag can typically only be reset by a system reset (it is set to false on system initialisation).

There are, therefore, effectively two ways of causing a brake engage signal, one of which is latched and the other of which can be transient.

The upper input to the OR gate (6) is potentially a transient brake engage signal, since if the position signals return to within a normal asymmetry range the upper OR gate input will revert back to false (no error).

The lower input to the OR gate (6) is only allowed by the latch to transition from false to true, once true it is not reset until the system restarts. Since the upper and lower signals are logically OR'ed, the latch in the lower input line also latches the output, meaning the brake will stay on regardless of whether the asymmetry clears.

Thus, in the present invention, the brakes are commanded ON as soon as the measured asymmetry exceeds the threshold and without the need to wait for a fault integrator to confirm that the fault is a true fault. If the measurement subsequently returns to within the normal range, the brakes will be commanded to release. The fault integration process occurs in parallel to the brakes being commanded in accordance with the most recent asymmetry measurement, and if the fault becomes confirmed by the fault integration process, the command signal for the brake becomes permanently latched.

As mentioned above, previously, the reason for performing the fault integration process has been to avoid braking in the event of spurious transient exceeding of the asymmetry threshold.

The present invention will still largely avoid the effects of spurious transitions, because the actual time it takes for the shutdown command to take effect is, in fact, actually greater than the fault integration time. In the event of an occasional spurious threshold exceeding values, therefore, this is most likely to be cleared before the resulting transitory shutdown command has had any effect on the system.

Thus, true failures will always be captured by the proposed scheme, but the delay associated with the fault integration would be eliminated from the response time.

The invention claimed is:

1. A system for monitoring asymmetry between two components, comprising;
    a comparator having a first input to receive a signal indicative of a position of a first component and a second input to receive a signal indicative of a position of a second component, the comparator configured to compare the difference between the first input and the second input to a predetermined threshold and to output a first signal state in the event that the difference exceeds the threshold;

means for performing an integration of a plurality of output first signal states from the comparator indicative of the difference exceeding the threshold; and means for outputting a command signal to actuate a brake connected to an output of the means for integration that outputs the command signal in response to the means for performing an integration determining that the number of times the difference exceeds the threshold is in excess of a given value;

wherein the system further outputs the command signal to actuate the brake, in response to the comparison, each time the difference exceeds the threshold.

2. The system of claim 1 wherein the means for performing an integration includes means for summing output signals from the comparator and comparing the sum to a maximum count value.

3. The system of claim 1 wherein the first and second components are components on an aircraft.

4. The system of claim 3, wherein the first and second components are components on one or more wings of an aircraft.

5. The system of claim 4, wherein the first and second components are panels, flaps and/or slats.

6. The system of claim 5 wherein the first and second components comprise flaps and/or slats on respective first and second wings of an aircraft.

7. The system of claim 1, wherein the output of the comparator is provided simultaneously to an OR gate (6) and, in parallel, to the means for performing an integration, and the output of the means for performing an integration is provided as a second input to the OR gate, the output of the OR gate providing the command signal.

8. A method for monitoring asymmetry between two components comprising:

comparing the difference between a first signal, indicative of a position of a first component, and a second signal, indicative of a position of a second component, with a predetermined threshold and outputting a signal in the event that the difference exceeds the threshold;

performing an integration of a plurality of output signals from the comparator indicative of the difference exceeding the threshold; and outputting a command signal to actuate a brake in response to the integrating means determining that the number of times the difference exceeds the threshold is in excess of a given value; and outputting the command signal to actuate the brake, in response to the comparing, each time the difference exceeds the threshold.

\* \* \* \* \*